F401U XR RE 6,701 ROSS REFERENCE SEARCH ROOM

C. A. DOUGLAS.

Faucet.

Re. No. 6,701.
109,191

BEST AVAILABLE COPY

Reissued Oct. 19, 1875.

Witnesses: Henry Binley, Chas. J. Seepick

Charles A. Douglas
by his Attorney
Alex. Sellers
Inventor.

N. PETERS, PHOTO-LITHOGRAPHER, WASHINGTON, D. C.

BEST AVAILABLE COPY

UNITED STATES PATENT OFFICE.

CHARLES A. DOUGLAS, OF FRANKLIN, NEW YORK.

IMPROVEMENT IN FAUCETS.

Specification forming part of Letters Patent No. 109,191, dated November 15, 1870; reissue No. 6,701, dated October 19, 1875; application filed October 1, 1875.

*To all whom it may concern:*

Be it known that I, CHARLES A. DOUGLAS, of Franklin, in the county of Delaware and State of New York, have invented certain new and useful Improvements in Faucets; and I do hereby declare that the following is a description thereof, reference being had to the accompanying drawings forming a part of this specification, in which—

Figure 1:
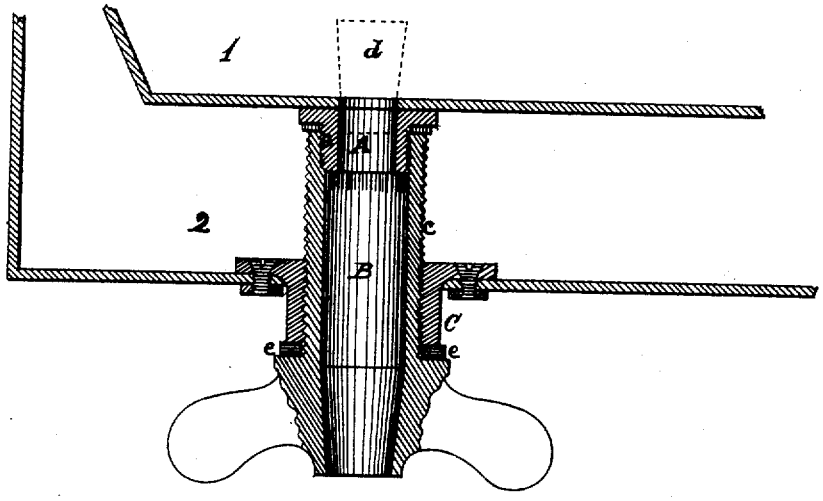
Figure 2:
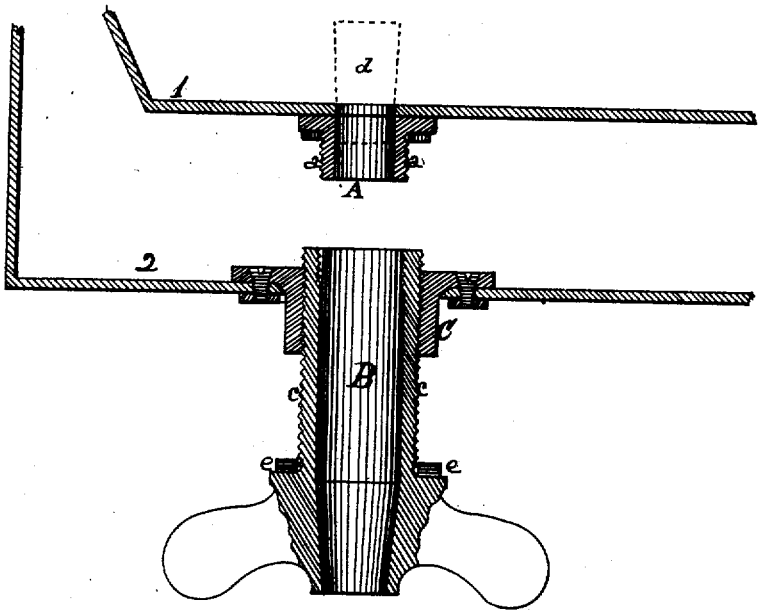

Figure 1 represents a sectional elevation of the faucet and the vessels (shown by sections) to which the same is intended to be applied, illustrating the same closed against drawing from the lower vessel, and in condition for drawing from the upper one. Fig. 2 is a sectional elevation of the same, illustrating the same opened for drawing from the lower vessel.

My invention relates to that class of faucets employed for drawing liquids from either one of two vessels placed one within the other, each having a different liquid to be drawn off, or the same kind of liquids to be drawn off at different times and discharged at the same point; and consists in the several devices constructed and combined in the manner hereinafter described, the object being to permit at any time the drawing of liquids from either of two vessels without the interfering or mixing of one with the other.

To enable others skilled in the art to make and use my invention, I will proceed to describe it in reference to the drawings and the letters of reference marked thereon, the same letters indicating like parts.

In the drawings, A is a short tube or conduct, provided with a screw-thread, *a*, on its outer periphery. The said tube is attached to the lower side of the bottom of the upper or inner vessel 1 by solder or otherwise, and is intended to conduct liquids from the said vessel. B is a second tube, connecting with the tube A by a screw-thread, and intended to be a continuation of said tube from the upper or inner vessel 1, through the space between said vessel and vessel 2, to the discharge end *b*, as shown in Fig. 1. The lower end of tube B is provided with radial handles, for convenience of operation. C is a short tube, secured to the bottom of the lower vessel 2 by bolts or other equivalent well-known means, and is intended to conduct the liquid from the said vessel for discharge into any vessel, pipes, or other suitable devices that may be employed to receive said liquid. The outer surface of the tube B is provided with a screw-thread, *c*, working with a screw-thread, also cut with the inner surface of tube C. The tube B is passed up through the tube C, and is screwed with the tube A, as shown in Fig. 1. With the packings *e e* a tight jointure will be formed, which will prevent all escape of liquid from either vessel, when the upper end of the tube A is closed by any suitable stopper or plug, *d*, as indicated by dotted lines in Fig. 1.

By the screw-thread *c* on the tube B, and the screw-thread cut in the tube C, the tube may be retained with the lower vessel 2, and form a discharge-nozzle for the tube C, through which the liquid in said vessel 2 may be discharged when the parts are as shown in Fig. 2.

By this improved faucet it is obvious that liquids may be drawn from either vessel without being mixed, as when the parts are in place, as in Fig. 1, with the plug *d* removed, the liquid in the upper vessel 1 may be drawn off, while when the tube B is disconnected from the tube A, as shown in Fig. 2, the liquid in the vessel 2 may be drawn off, even when the vessel 1 is filled, provided the plug *d* is made to close the tube A, as shown by dotted lines in said figure.

Having described my invention, what I claim, and desire to secure by Letters Patent, is—

1. The tube A, connecting with the bottom of the inner vessel 1, and the tube B, connecting by a screw-thread with said tube A, and terminating below the lower vessel 2, when combined to operate substantially in the manner set forth.

2. The tubes A and B, connecting with each other by screw-threads, with tube A fixed to the bottom of the inner vessel 1, and the tube C attached to the bottom of the lower vessel 2, with the tube B bearing against the lower end of said tube C, when combined to operate substantially as and for the purposes set forth.

CHARLES A. DOUGLAS.

Witnesses:

CHAS. NOBLE,

AMOS DOUGLAS.